US010606657B2

United States Patent
Yadhav et al.

(10) Patent No.: US 10,606,657 B2
(45) Date of Patent: Mar. 31, 2020

(54) METHODS AND MODULES RELATING TO ALLOCATION OF HOST MACHINES

(71) Applicant: Telefonaktiebolaget LM Ericsson (publ), Stockholm (SE)

(72) Inventors: Vinay Yadhav, Upplands Vasby (SE); Daniel Turull, Solna (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 16/306,555

(22) PCT Filed: Jul. 7, 2016

(86) PCT No.: PCT/SE2016/050696
§ 371 (c)(1),
(2) Date: Nov. 30, 2018

(87) PCT Pub. No.: WO2018/009108
PCT Pub. Date: Jan. 11, 2018

(65) Prior Publication Data
US 2019/0294476 A1    Sep. 26, 2019

(51) Int. Cl.
*G06F 9/50* (2006.01)
(52) U.S. Cl.
CPC .............. *G06F 9/5061* (2013.01); *G06F 9/50* (2013.01); *G06F 9/5027* (2013.01); *G06F 2209/5011* (2013.01)
(58) Field of Classification Search
CPC ........ G06F 9/5061; G06F 9/50; G06F 9/5027; G06F 2209/5011
See application file for complete search history.

(56) References Cited

U.S. PATENT DOCUMENTS

2004/0243660 A1* 12/2004 Chew .................... G06F 9/5061
                                                                    709/200
2014/0149663 A1    5/2014 Golander et al.

FOREIGN PATENT DOCUMENTS

WO    2017146618 A1    8/2017

OTHER PUBLICATIONS

International Search Report and Written Opinion for Application No. PCT/SE2016/050696, dated Mar. 13, 2017, 13 pages.

(Continued)

*Primary Examiner* — Michael A Keller
(74) *Attorney, Agent, or Firm* — NDWE LLP

(57) ABSTRACT

A Weight Generating Module for generating a respective set of weights representing a respective policy of a plurality of policies. The respective set of weights defines a respective host machine. The Module calculates a respective user-defined number of pairs for each collection of a number of collections by distributing a total number of pairs among the number of collections for each respective policy based on a respective set of user-defined weights and a respective allocation weight. The Module selects, for said each collection, the respective user-defined number of pairs in increasing order with respect to the latencies to obtain a respective sub-set of collection weights relating to latencies associated with said each collection. The Module determines, for said each respective policy, the respective set of weights representing the respective policy based on a set of collection weights. The Module provides, for said each respective policy, the respective set of weights.

9 Claims, 5 Drawing Sheets

(56) References Cited

OTHER PUBLICATIONS

International Preliminary Report on Patentability, PCT App. No. PCT/SE2016/050696, dated Jan. 17, 2019, 8 pages.

* cited by examiner

| | Memory Unit Group | | | | | |
|---|---|---|---|---|---|---|
| CPU Unit Groups | | M1 | M2 | M3 | M4 | M5 | M6 |
| | C1 | 3 | 4 | 5 | 4 | 5 | 6 |
| | C2 | 2 | 3 | 4 | 3 | 4 | 5 |
| | C3 | 1 | 2 | 3 | 2 | 3 | 4 |
| | C4 | 4 | 5 | 6 | 3 | 4 | 5 |
| | C5 | 3 | 4 | 5 | 2 | 3 | 4 |
| | C6 | 2 | 3 | 4 | 1 | 2 | 3 |

METHODS AND MODULES RELATING TO ALLOCATION OF HOST MACHINES

CROSS-REFERENCE TO RELATED APPLICATIONS

This application is a National stage of International Application No. PCT/SE2016/050696, filed Jul. 7, 2016, which is hereby incorporated by reference.

TECHNICAL FIELD

Embodiments herein relate to computer systems, such as so called cloud computing systems. In particular, a method and a Weight Generating Module for generating a respective set of weights representing a respective policy out of a plurality of policies, e.g. to be applied in a hardware system, such as the aforementioned cloud computing system, are disclosed. A corresponding computer program and a computer program carrier are also disclosed.

BACKGROUND

Computer systems are formed by hardware and software architectures. Hardware architectures deal with how different resources, such as processing power, memory, networking interface and the like, are interconnected to, e.g. in terms of physical formats, number of wires, each other. Software architectures deal with how different programs, such as operating systems, applications, applets, virtual machines and more, are executed on the hardware architecture.

Traditional hardware architectures, used for e.g. a Data Center, a cloud computing system, are typically built up by a plurality of racks, such as cabinets, that are networked together. Each rack comprises one or more fully functional computers, e.g. embodied as one or more server blades. Hence, each server blade is self-contained with resources, such as processors, memory, storage, networking interface and Input/Output (I/O) peripherals. An issue with a server blade is its static nature with regard to composition of resources. This implies that once the server blade has been assembled, processing capacity, memory capacity, network interface capacity etc. cannot be upgraded without physical intervention with the server blade, e.g. memory capacity could be upgraded by manually inserting more memory into the server blade.

In order to solve this issue, and other issues, disaggregated hardware architectures have emerged. A disaggregated hardware architecture, such as Intel Rack Scale architecture and HyperScale Datacenter Systems, separates the resources—which with the traditional hardware architecture would have been confined within one blade—that make up a hardware machine, such a server. The separated resources are organized into pools. Then, a host machine is allocated by picking resources of from the pools.

An exemplifying known disaggregated hardware system 1 is shown in FIG. 1. The known disaggregated hardware system 1 comprises an interconnect 2, such as a superfast optical fiber connectivity. The interconnect 2 interconnects a Central Processing Unit (CPU) pool 3, a memory pool 4 and a storage pool 5. The memory pool 4 may refer to short-term memories, such as cache memory or the like, whereas the storage pool 5 may refer to long-term storage, such as hard drives, magnetic tape, etc. Here, long-term and short-term shall be considered in relation to each other. Typically, each pool comprises one blade. With this set up, e.g. the CPU pool 3 and the disk pool 5 will be available also during replacement of the memory pool 4, while it may be assumed that other memory pools (not shown) may support, at least during the replacement, any need of memory that the CPU pool 3 and the disk pool 5 may have. The CPU pool 3 comprises CPUs, the memory pool 4 comprises memory units, and the disk pool comprises disk units, all shown as rectangles in their respective pool. A Host Machine Manager 6 handles allocation of host machines. In this example, three host machines 10, 20 and 30 are illustrated in the Figure.

Since the resources of the disaggregated hardware system are clubbed into pools, access latency between resources in each pool is not uniform. For example, access latencies between a CPU in the CPU pool will not be uniform toward different memory units in a memory pool. Therefore, when the Host Machine Manager 6 has picked a first host machine 10 and a second host machine 30 as shown in FIG. 1, varying latencies of memory access for the CPUs of the first and second host machine 10, 30, can lead to that the two host machines 10, 30, which otherwise e.g. have identical numbers of CPUs and memory units, have different performance.

A problem is hence how to ensure predictable and/or desired performance of host machines in a disaggregated hardware system of the above mentioned kind.

Now returning to the traditional hardware architecture, in case of a Non-Uniform Memory Access (NUMA) architecture, a known server blade has a CPU which is connected to local memory units and remote memory units. Since latency for the CPU to access the local memory units is less that of accessing the remote memory units, memory is allocated to local memory units as far as possible. In this manner, performance is kept as high as possible.

SUMMARY

An object may be to overcome, or at least reduce, the above mentioned problem in relation to allocation of aforementioned host machine(s).

According to an aspect, the object is achieved by a method, performed by a Weight Generating Module, for generating a respective set of weights representing a respective policy out of a plurality of policies. The respective set of weights defines a respective allocation of a respective host machine, obtained from a hardware system. The hardware system comprises a memory pool, comprising memory units, and a CPU pool, comprising CPUs. A total number of pairs of groups, comprising the CPUs and memory units, are associated with latencies, each of the latencies indicating a respective latency between a respective group of CPUs and a respective group of memory units. The respective policy is defined by a respective set of user-defined weights relating to a number of collections of the pairs. The respective policy is associated with a respective allocation weight relating to requests for the respective allocation of the respective host machine.

The Weight Generating Module calculates a respective user-defined number of pairs for each collection of the number of collections by distributing the total number of pairs among the number of collections for each respective policy based the respective set of user-defined weights and the respective allocation weight.

Moreover, the Weight Generating Module selects, for said each collection, the respective user-defined number of pairs from among the total number of pairs in increasing order with respect to the latencies to obtain a respective sub-set of collection weights relating to latencies associated with said each collection. A set of collection weights comprises each of the respective sub-sets of collection weights.

The Weight Generating Module determines, for said each respective policy, the respective set of weights representing the respective policy based on the set of collection weights.

Furthermore, the Weight Generating Module provides, for said each respective policy, the respective set of weights.

According to another aspect, the object is achieved by a Weight Generating Module configured for generating a respective set of weights representing a respective policy out of a plurality of policies. The respective set of weights defines a respective allocation of a respective host machine, obtained from a hardware system. The hardware system comprises a memory pool, comprising memory units, and a CPU pool, comprising CPUs. A total number of pairs of groups, comprising the CPUs and memory units, are associated with latencies, each of the latencies indicating a respective latency between a respective group of CPUs and a respective group of memory units. The respective policy is defined by a respective set of user-defined weights relating to a number of collections of the pairs. The respective policy is associated with a respective allocation weight relating to requests for the respective allocation of the respective host machine.

Moreover, the Weight Generating Module is configured for calculating a respective user-defined number of pairs for each collection of the number of collections by distributing the total number of pairs among the number of collections for each respective policy based the respective set of user-defined weights and the respective allocation weight.

The Weight Generating Module is configured for selecting, for said each collection, the respective user-defined number of pairs from among the total number of pairs in increasing order with respect to the latencies to obtain a respective sub-set of collection weights relating to latencies associated with said each collection. A set of collection weights comprises each of the respective sub-sets of collection weights.

Furthermore, the Weight Generating Module is configured for determining, for said each respective policy, the respective set of weights representing the respective policy based on the set of collection weights.

The Weight Generating Module is configured for providing, for said each respective policy, the respective set of weights.

According to further aspects, the object is achieved by a computer program and a computer program carrier corresponding to the aspects above.

Thanks to that the Weight Generating Module calculates the respective user-defined number of pairs for said each collection by distributing the total number of pairs among the number of collections for said each respective policy based the respective set of user-defined weights and the respective allocation weight, the respective user-defined number of pairs takes into account expected need for allocation of each respective host machine.

Then the Weight Generating Module selects, for said each collection, the respective user-defined number of pairs from among the total number of pairs in increasing order with respect to the latencies to obtain the respective sub-set of collection weights. In this manner, the Weight Generating Module picks pairs of groups to represent, according to the respective sub-set of collection weights, said each collection, whereby said each collection of the pairs may be said to be translated into the respective sub-set of collection weights for pairs of the hardware system.

Now that the collections may be represented by the respective sub-set of collection weights for pairs, the respective set of weight representing the respective policy is determined, by the Weight Generating Module, based on the set of collection weights.

In this manner, it may be ensured that resources, such as CPUs, memories and the like, in each CPU and/or memory pool may suffice for allocation, i.e. enough available resources should be present, when requests for allocations of the respective host machine of a certain policy occurs according to expectations, as given by the respective allocation weight. Accordingly, utilization of resources of may increase, since demand for policies are taken into account thanks to the allocation weights.

An advantage is hence that predictable and uniform performance of the host machine is achieved. The performance, e.g. in terms of latency, is said to be predictable, since the performance is related to the policy given in the request. The performance is said to be uniform, since two host machines with the same policy will obtain the same, or almost the same, performance. Furthermore, the performance is said to be uniform, since when a host machine is allocated at two different time instances, the performance for the host machine becomes the same, or almost the same.

Moreover, thanks to the respective allocation weight utilization of resources in the hardware system may be improved, i.e. risk of allocation failure due to unavailability of a resource required for a requested allocation may be reduced.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
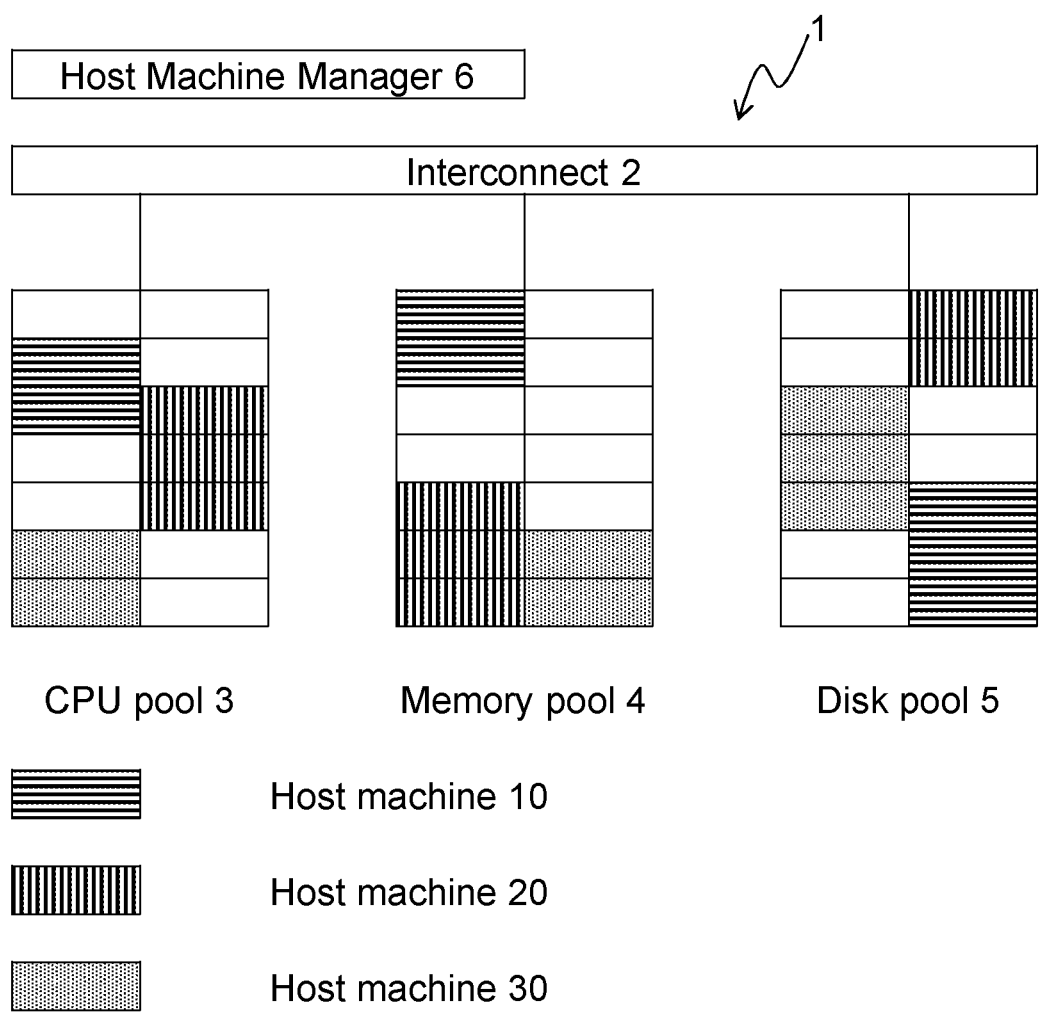
FIG. 1 is a schematic block diagram of a known disaggregated hardware system.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 2:
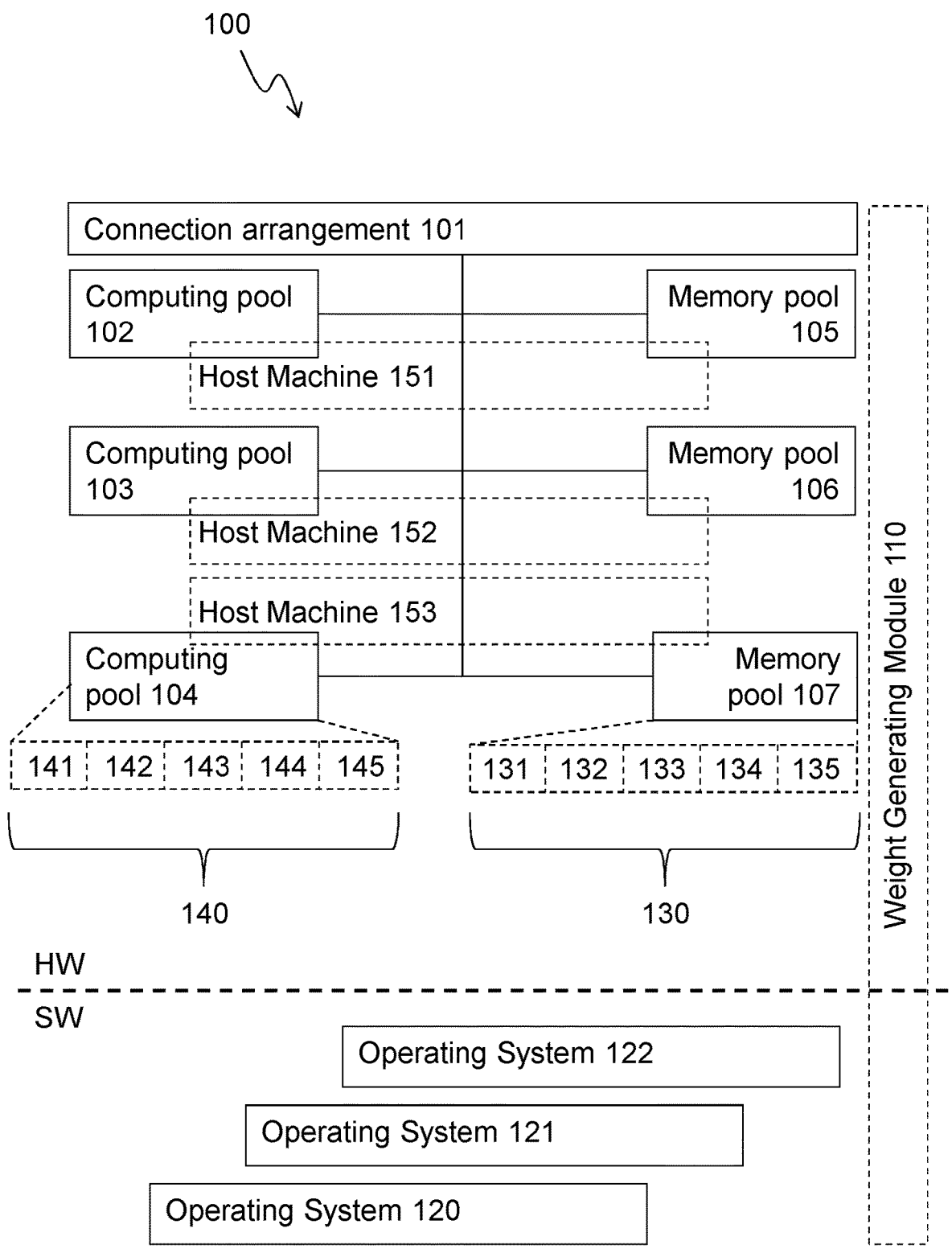
FIG. 2 is a schematic block diagram of an exemplifying hardware system in which embodiments herein may be implemented.

FIG. 2 depicts an exemplifying hardware system 100 in which embodiments herein may be implemented. The hardware system 100 may be a disaggregated hardware system as disclosed in the background section.

Generally, the hardware system 100 relies on a principle of hardware resource disaggregation. The principle of hardware disaggregation considers CPU, memory and network resources as individual and modular components. The resources are often organized in pools, such as blades, sleds etc. That is, there is a pool of CPU units and a pool of memory units. The resources may comprise many other different kinds of pools, such as storage pools, pools of network interfaces, etc., but throughout this disclosure pools of CPUs and memory units are discussed for reasons of relevance. The terms "CPU pool", "memory pool" etc. will be used herein to refer to a pool of CPUs and a pool of memory units. When utilizing the hardware system, a host machine may be composed of a sub-set of units/resources within one or more pools. In some examples, a Host Machine Allocating Module (not shown) may assemble a host machine 151, 152, 153 by selecting a sub-set of resources within one or more pools. In this manner, a number of resources are allocated to the host machine 151, 152, 153. In related literature, the host machine may be referred to by the terms "logical hardware machine" and "virtual hardware machine".

In more detail, the hardware system 100 may comprise a connection arrangement 101 for interconnecting a set of CPU pools 102, 103, 104 with a set of memory pools (e.g., memory blades) 105, 106, 107. The connection arrangement 101 may be realized by optical fibers. Thus, a fast interconnection, as an example of the connection arrangement 101, between the sets of computing and memory pools 102-107 is provided.

Each memory pool of the set of memory pools 105, 106, 107 may be comprised in a rack of memory pools or the like. A rack refers to a closet, a cabinet or the like for housing some or all of the sets of computing and memory pools 102-107.

Moreover, the set of memory blades 105, 106, 107 may comprise one or more of:

a set of primary storage pools for use by the set of CPU pools, a set of cache memory blades for use by the set of CPU pools, and the like.

The set of primary storage pools may be realized in the form of so called cache memory(ies) and/or Random Access Memory(ies). The storage pools may include hard disc drives of various kinds, such as Solid State Drives, magnetic tape, conventional drives of various form factors (inches) and interfaces, such as Small Computer System Interface (SCSI), Integrated Drive Electronics/AT Attachment (IDE/ATA), Serial ATA (SATA), etc.

Each CPU pool, or computing pool, comprises computing units 141, 142, 143, 144, 145. The CPU pools 102, 103, 104 may be realized in the form of one or more sleds, blades or assemblies of one or more computer racks (not shown). The computing units 141, 142, 143, 144, 145 may comprise CPUs, Graphics Processing Units (GPUs), hardware implemented computing functions, etc. At least some CPU pools 102, 103, 104 may lack at least one cache level, which in conventional computer systems typically is co-located i.e. placed on a Printed Circuit Board (PCB) together with the CPU(s). Cache levels are typically known as L1, L2 or L3 caches in the related literature. In some examples though, e.g. due to latency requirements, each CPU pool may include any number of cache levels, which may or may not be backed up by, i.e. supported by, one or more further levels of cache memory comprised in the set of memory blades 105, 106, 107 as mentioned above. In further examples, some CPU pools 102, 103, 104 may comprise a first level of primary storage pools and a second level of primary storage pools may be comprised in the set of memory blades, where latency of the first level of primary pools typically is less than latency of the second level of primary pools. Thus, primary storage for the hardware system, taken as a whole, is organized in a hierarchical manner spanning over both computing and memory blades. Generally, the hardware system may comprise CPU pools and memory blades, wherein the memory blades comprises at least some primary memory, e.g. the second level of primary storage pools, used by the set of CPU pools.

Each memory blade comprises memory units 131, 132, 133, 134, 135. The memory blades 105, 106, 107 may be realized in the form of one or more sleds, blades or assemblies of one or more computer racks, the same, different or partially the same one(s) as compared the above mentioned racks for the CPU pools. Each memory blade may preferably lack any substantial processing capabilities. Such substantial processing capabilities, or computing resources, is thus provided by means of the CPU pools 102, 103, 104.

In more detail, the memory units may be arranged on a memory board, as an example of memory blade, and the computing units 140 are arranged on a computing board, as an example of CPU pool and/or computing blade. The memory board is different from the computing blade. This may mean that the memory blade is a Printed Circuit Board (PCB) that is separate from a further PCB at which the computing units may be mounted.

The memory board and the computing board are connected to the connection arrangement 101 to interconnect the set of memory blades 105, 106, 107 and the set of CPU pools 102, 103, 104. The set of memory blades 105, 106, 107 are mountable, such as installable, in a first plurality of cabinets, while still being connected to the connection arrangement. The set of CPU pools 102, 103, 104 are mountable in a second plurality of cabinets, wherein some, none or all of the cabinets of the first and second plurality of cabinets are different from each other. This means that in one exemplifying realization, there is provided at least one memory cabinet, comprising memory blades, and at least one computing cabinet, comprising CPU pools. In another realization, there may be one or more cabinets, wherein at least some of said one or more cabinets comprises both memory blades and CPU pools, and/or wherein at least some of said one or more cabinets comprises either memory blades or CPU pools.

At the software side (SW), as opposed to the hardware (HW) side described above, one or more operating systems 120, 121, 122 may be executed on a respective logical hardware machine. This means that the computer system 100 hosts one or more operating systems 120, 121, 122. It shall here be said that a line between HW and SW is often somewhat fuzzy, since various programming languages enable implementation of a module both as hardware and software, also a Field Programmable Gate Array (FPGA) can be seen as a half-SW and half-HW component. As indicated above, the respective logical hardware machine may comprise a selected set of CPU pools and a selected set of memory blades. The operating systems 120, 121, 122 may be referred to as virtual hosts, instances or the like, when executed by the computer system 100. Each operating system 120, 121, 122 may in its turn manage one or more instances of a software application, a virtual machine, database, a software library or the like. Accordingly, as used herein, the term "instance" may refer to an instance of a virtual host, an operating system, a software application, a virtual machine, a database, a software library or the like.

Figures 3, 4:
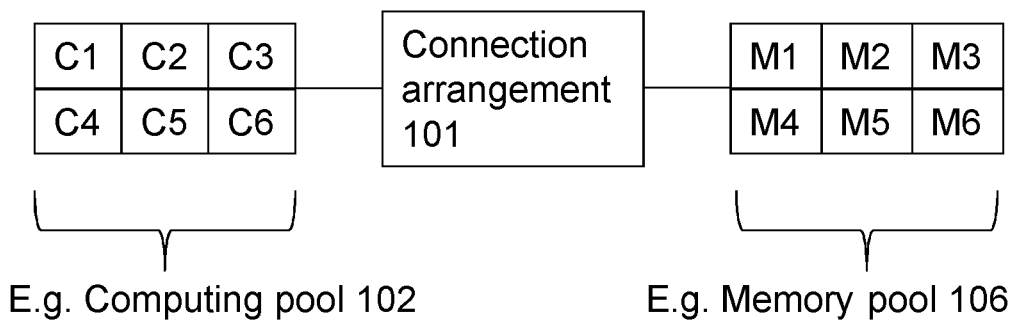
FIG. 3 is a detailed block diagram of a portion of the exemplifying hardware system of FIG. 2.
FIG. 4 is an example of information about latency ratings.

Now turning to FIG. 3, a more detailed view of a first CPU pool 102, i.e. one of the CPU pools shown in FIG. 2, and a first memory pool 106, i.e. one of the CPU pools shown in FIG. 2, is shown.

In line with the above, the first CPU pool 102, 103, 104 comprises CPUs and the memory pool 106 comprises memory units. In FIG. 3, groups of CPUs C1-C6 comprise one or more CPUs, preferably a plurality of CPUs. Similarly, groups of memory units M1-M6 comprise one or more memory units, preferably a plurality of memory units. This means that each of the boxes C1-C6, M1-M6 illustrates a group of CPUs or memory units. An exact or minimum amount for the plurality of CPUs/memory units may depend on the application. As an example, the minimum amount may be 3, 10, 50, 100, 120, 400, 1000, 10 000, 100 000 etc. or the like.

FIG. 3 illustrates that e.g. a first latency for a first pair of groups, e.g. comprising a first group of CPUs C1 and a first group of memory units M6 is different from a second latency for a second pair of groups, e.g. comprising a second group of CPUs C3 and a second group of memory units M4. As an example, the first latency may be 32 nanoseconds (ns) and the second latency may be 7 ns. The first and second latencies may be classified into latency ratings as elaborated below.

FIG. 4 illustrates an example of latency ratings for each possible pair of CPU/memory groups. The latency ratings may be organized in a table, i.e. a Latency Rating Table (LRT). In other examples, the latency ratings may be organized in any other appropriate manner, such as an indexed listed, matrix or the like. Said each pair comprises one group C1-C6 of CPUs and one group M1-M6 of memory units. Said each pair is associated with a respective latency rating among the latency ratings.

In more detail, latency ratings may be mapped to a range in nanoseconds (ns) for some measured/estimated latency in the following manner:

1—5 ns,
2—5-10 ns,
3—10-15 ns,
4—15-20 ns,
5—20-30 ns, and
6—>30 ns.

The above ranges are merely provided as an example. Therefore, the ranges may be different from the above in other examples. Estimation of latencies may be done based on in advance known distance between CPU-memory unit or it may be done by calculation/measurement of latencies when a new CPU or memory unit is added to a CPU/memory unit pool.

The respective latency rating indicates latency between said one group C1-C6 of CPUs and said one group M1-M6 of memory units of said each pair.

Returning to FIG. 2, it shall be noted that the Host Machine Allocating module 110 is configured for managing the information about latency ratings for the pairs of groups C1-C6, M1-M6 comprising CPUs and memory units.

From the table, it may e.g. be seen that for different pairs, the latency rating may increase with distance between the groups forming the pair. In addition or alternatively, it may be that quality, load (of connection between groups) and more, of a connection between the groups affects the latency rating. In the table, access latencies between CPUs and memory units are quantified.

Further elaborating on the groups of CPUs, now expressed somewhat differently from the above, the CPUs may be said to be organized into a first plurality of groups of CPUs, the first plurality of groups being referred to as "first groups". Each CPU of each first group has a first common latency rating towards the connection arrangement 101, or a particular group of memory units.

Similarly, the memory units may be said to be organized into a second plurality of groups of memory units, the second plurality of groups being referred to as "second groups". Each memory unit of each second group has a second common latency rating towards the connection arrangement 101, or a particular group of CPUs.

Again, but now in the context of the first and second groups, the Host Machine Allocating module 110 is configured for managing information about latency ratings for pairs, each pair comprising one first group and one second group, wherein the information associates said each pair with a respective latency rating among the latency ratings.

In order to better appreciate the embodiments herein, some observations that have been made are described here.

A mere distribution of CPU-Latency pairs into different policies may underutilize the resources of the hardware system 100. If one resource is more demanded, due to more requests for allocation of host machines of that policy, than another resource, load on these resources will be unbalanced. For example, it may disadvantageously happen that all resources of a certain CPU-latency pair are occupied and a request needs to be rejected. With the embodiments herein, this and other disadvantages may be alleviated, or at least reduced to some extent.

Before proceeding with a more detailed description of the embodiments herein, some features are briefly discussed.

According to some embodiments herein, memory units are associated, in a hierarchical manner, with the CPUs such that a host machine is allocated, or composed, from the hardware system, i.e. the CPUs and memory units thereof, with predictable latency, or access delay.

Thanks to that CPUs and memory units are allocated from different pairs of groups, the respective latency for each pair will be different, i.e. some will achieve high latency while others will achieve low latency. But for the host machine, when considered as an entity, an average latency will fall predictably within a narrow range, such as the above listed ranges for the latency ratings.

It may here be noted that latency, access latency, latency rating and the like relates to a duration of time from when a request for access to a memory is sent until contents of the accessed memory is available for processing by a CPU.

Figure 5:
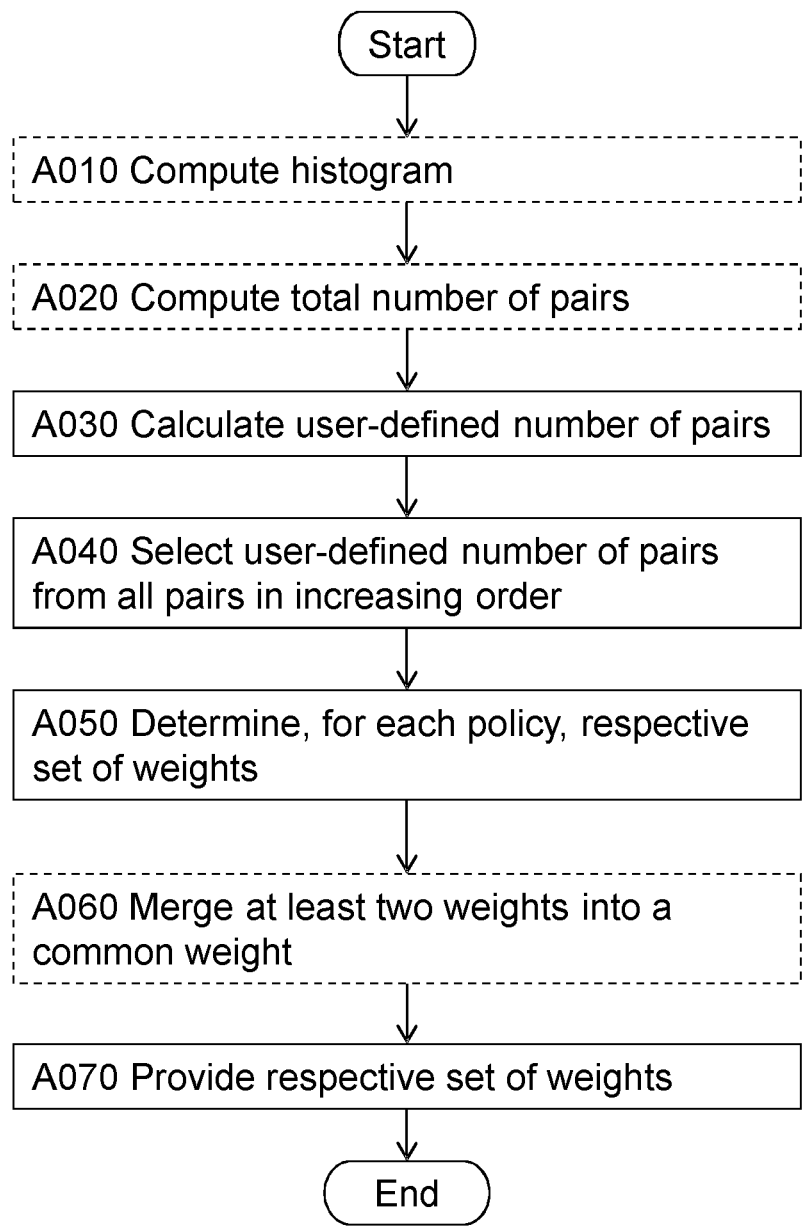
FIG. 5 is a flowchart illustrating embodiments of the method in the Weight Generating Module.

FIG. 5 illustrates an exemplifying method according to embodiments herein when implemented in the hardware system 100 of FIG. 2. The Weight Generating Module 110 performs a method for generating a respective set of weights representing a respective policy out of a plurality of policies.

The respective set of weights defines a respective allocation of a respective host machine 151, 152, 153 obtained from a hardware system 100.

As mentioned, the hardware system 100 comprises the memory pool 105, 106, 107, comprising memory units, and the CPU pool 102, 103, 104, comprising CPUs. A total number of pairs of groups C1-C6, M1-M6, comprising the CPUs and memory units, are associated with latencies, each of the latencies indicating a respective latency between a respective group C1-C6 of CPUs and a respective group M1-M6 of memory units. The respective policy is defined by a respective set of user-defined weights relating to a number of collections of the pairs. The respective policy is associated with a respective allocation weight relating to requests for the respective allocation of the respective host machine 151, 152, 153.

The method may be executed 1) offline, i.e. before the hardware system 100 starts, 2) online, i.e. during operation of the hardware system 100, 3) at intervals defined by an operator of the hardware system 100. Briefly, the method proposes to distribute all pairs in a number of user-defined collections according to the plurality of policies. Each policy is formed by a respective weighted portion of each collection. This reduces variation of average latency of memory access for the respective host machine. Thus, determinism is increased.

According to a first example, in which three different latencies are already computed and specified in e.g. the LRT mentioned above. In this example, it is assumed that the operator, such as a user managing the hardware system 100, requests two policies. A total number of requests for these policies are expected to include 60% requests for one of the policies and 40% request for the other one of the policies. The operator defines two collections in which all CPU-memory pairs of the hardware system 100 are to be distributed (as shown in Table 1 below). Said all CPU-memory pairs have a distribution of latency as shown in Table 2 below.

TABLE 1

User-defined weights and allocation weights

|  | Collection 1 | Collection 2 | % of Req |
|---|---|---|---|
| Policy 1 | 0.8 | 0.2 | 60 |
| Policy 2 | 0.1 | 0.9 | 40 |

Thus, input to the method and the Weight Generating Module 110 is:
- user-defined weights and thus also a number of policies that are desired,
- allocation weights, and
- the CPU-memory latency pairs, e.g. stored in the LRT table mentioned above.

One or more of the following actions may be performed in any suitable order.

Action A010

The Weight Generating Module 110 may compute a histogram including a respective number of pairs for each respective latency of the latencies. Continuing with the first example, the histogram may be exemplified by Table 2. Notably, the histogram is not related to the user-defined weights and the allocation weight, but rather the histogram is dependent on configuration of the hardware system 100, where the configuration relates to number of CPUs and memory units.

TABLE 2

Distribution of latencies

| Latency (ns) | Number of pairs |
|---|---|
| 2 | 1000 |
| 4 | 500 |
| 6 | 500 |

In the table above, no grouping of CPUs and memory units as explained above in relation to FIG. 3 and FIG. 4 is assumed. In a real-life example, the number of rows of an exemplifying Table 2 is thus expected to be larger. In many examples, it may therefore be beneficial, in terms of computational efficiency, to reduce the number of rows by performing some kind of grouping and/or rating according the description of FIG. 3 and/or FIG. 4. When applying the grouping and/or rating of FIG. 3 and/or FIG. 4, the term "latencies" will correspond to "latency ratings" when appropriate. This means that in order for the Weight Generating Module 110 to be able to manage latency ratings, latency ratings may be created, and e.g. organized into a table, such as a Latency Rating Table (LRT).

Action A020

The Weight Generating Module 110 may compute the total number of pairs based on the histogram.

Thus, according to the first example, the total number of pairs is (1000+500+500) pairs=2000 pairs.

Action A030

The Weight Generating Module 110 calculates a respective user-defined number of pairs for each collection of the number of collections by distributing the total number of pairs among the number of collections for each respective policy based the respective set of user-defined weights and the respective allocation weight.

According to the first example, as part of this action, the Weight Generating Module 110 may for each respective policy and said each collection determine a respective number of latency pairs as shown in Table 3 below.

TABLE 4

| Subgroup | Operation | User-defined number of pairs |
|---|---|---|
| Policy 1 - Collection 1 | 2000 × 0.8 × 0.6 | 960 |
| Policy 1 - Collection 2 | 2000 × 0.2 × 0.6 | 240 |
| Policy 2 - Collection 1 | 2000 × 0.1 × 0.4 | 80 |
| Policy 2 - Collection 2 | 2000 × 0.9 × 0.4 | 720 |

The column "operation" in Table 4 refers to the total number of pairs multiplied by a respective user-defined weight of the respective set of user-defined weights for said each collection multiplied by the respective allocation weight for said each respective policy.

Moreover, according to the first example and as part of this action, the Weight Generating Module 110 may for said each collection sum all the pairs assigned to the same collection. See Table 5 below.

TABLE 5

| | User-defined number of pairs |
|---|---|
| Collection 1 | 960 + 80 = 1040 |
| Collection 2 | 240 + 720 = 960 |

Action A040

The Weight Generating Module 110 selects, for said each collection, the respective user-defined number of pairs from among the total number of pairs in increasing order with respect to the latencies to obtain a respective sub-set of collection weights relating to latencies associated with said each collection. A set of collection weights comprises each of the respective sub-sets of collection weights.

According to the first example, as part of this action, the Weight Generating Module 110 may iterate for said each collection of user-defined number of pairs to determine the respective sub-sets of collections weights relating to latencies associated with said each collection. The Weight Generating Module 110 may iterate through Table 5 for said each collection until all user-defined number of pairs has been distributed among the pairs associated with respective latencies.

Partial result of an iteration—selecting from pairs of latency 2 of Table 2.

| Collection 1 | (1000/1040, L2) |
|---|---|
| Collection 2 | |

(1000/1120, L2) shall be understood as meaning select 1000 pairs out of the 1120 pairs according to Table 5 from pairs of latency 2 according to Table 2.

Partial result of another iteration—selecting from pairs of latency 4 of Table 2.

| Collection 1 | (1000/1040, L2) | (40/1040, L4) |
|---|---|---|
| Collection 2 | (460/960, L4) | |

The remaining pairs for collection 1 are selected, or picked, from latency 4 according to Table 2. The remaining pairs of latency 4 of Table 2 are assigned to collection 2. Thus, the pairs of latency 4 are split between collection 1 and 2.

In a further iteration, the remaining pairs (880-380 pairs=500 pairs) are assigned to collection 2 from latency 6 of Table 2.

| Collection 1 | (1000/1040, L2) | (40/1040, L4) |
|---|---|---|
| Collection 2 | (460/960, L4) | (500/960, L6) |

After writing the ratios in the table directly above as decimal numeral, the table becomes:

| Collection 1 | (0.96, L2) | (0.04, L4) |
|---|---|---|
| Collection 2 | (0.48, L4) | (0.52, L6) |

Now each user-defined collection may be represented by pairs of CPUs and memory units according to the weighting above, i.e. according to the respective set of collection weights.

Action A050

The Weight Generating Module 110 determines, for said each respective policy, the respective set of weights representing the respective policy based on the set of collection weights.

According to the first example, as part of this action, the Weight Generating Module 110 may apply the respective sets of collection weights in order for the policies to be represented by the pairs of the hardware system 100.

| | Collection 1 | Collection 2 |
|---|---|---|
| Policy 1 | 0.8*0.96 L2-0.8*0.04 L4 | 0.2*0.48 L4-0.2*0.52 L6 |
| Policy 2 | 0.1*0.96 L2-0.9*0.04 L4 | 0.9*0.48 L4-0.9*0.52 L6 |

| | Collection 1 | Collection 2 |
|---|---|---|
| Policy 1 | 0.76 L2-0.03° L4 | 0.1° L4-0.1 L6 |
| Policy 2 | 0.1 L2-0.04^ L4 | 0.43^ L4-0.47 L6 |

Consolidation of the L4-weights (° and ^) yields:

| | Sets of weights |
|---|---|
| Policy 1 | 0.76 L2-0.13 L4-0.1 L6 |
| Policy 2 | 0.1 L2-0.47 L4-0.47 L6 |

Action A060

The Weight Generating Module 110 may merge, at least two weights of the respective set of weights into a common weight representative of any pair associated with latencies for said at least two weights.

In some examples, weights for pairs of two different latencies may be small, such as below a threshold value of e.g. 0.01, 0.1, 0.2 or the like:

Hence, in another example of sets of weights, for another example of Table 2 having L2. L4. L6 and L8 may be:

| | Sets of weights |
|---|---|
| Policy 1 | 0.5 L2-0.4 L4-0.05 L6-0.05 L8 |
| Policy 2 | 0.2 L2-0.2 L4-0.2 L6-0.4 L8 |

In this example, the Weight Generating Module 110 may merge "0.05"-weights of L6 and L8 for policy 1 into a common weight of "0.1" for L6 or L8. Thus, allowing for flexibility when allocating the pairs associated with the common weight, since the pairs may then be chosen from any one of L6 and L8.

Action A070

The Weight Generating Module 110 provides, for said each respective policy, the respective set of weights. In this manner, the Weight Generating Module 110 may send the respective set of weights for said each policy to other entities such as to inform about the resulting respective set of weights. The respective set of weights may then be used in various scenarios, including e.g. SLA, determinism on allocation resources, composition of host machines with a fix latency to CPU-memory or the like.

The embodiments herein may be used to automatically derive the respective set of weights that should be associated with the respective policy of as defined by an operator of the hardware system 100. In this manner, the operator, such as a datacenter administrator, may determine the weights for each policy dynamically as and when the resources in the hardware system 100 change. In this manner, impact on policies due to changes to the hardware system 100 is reduced.

Figure 6:
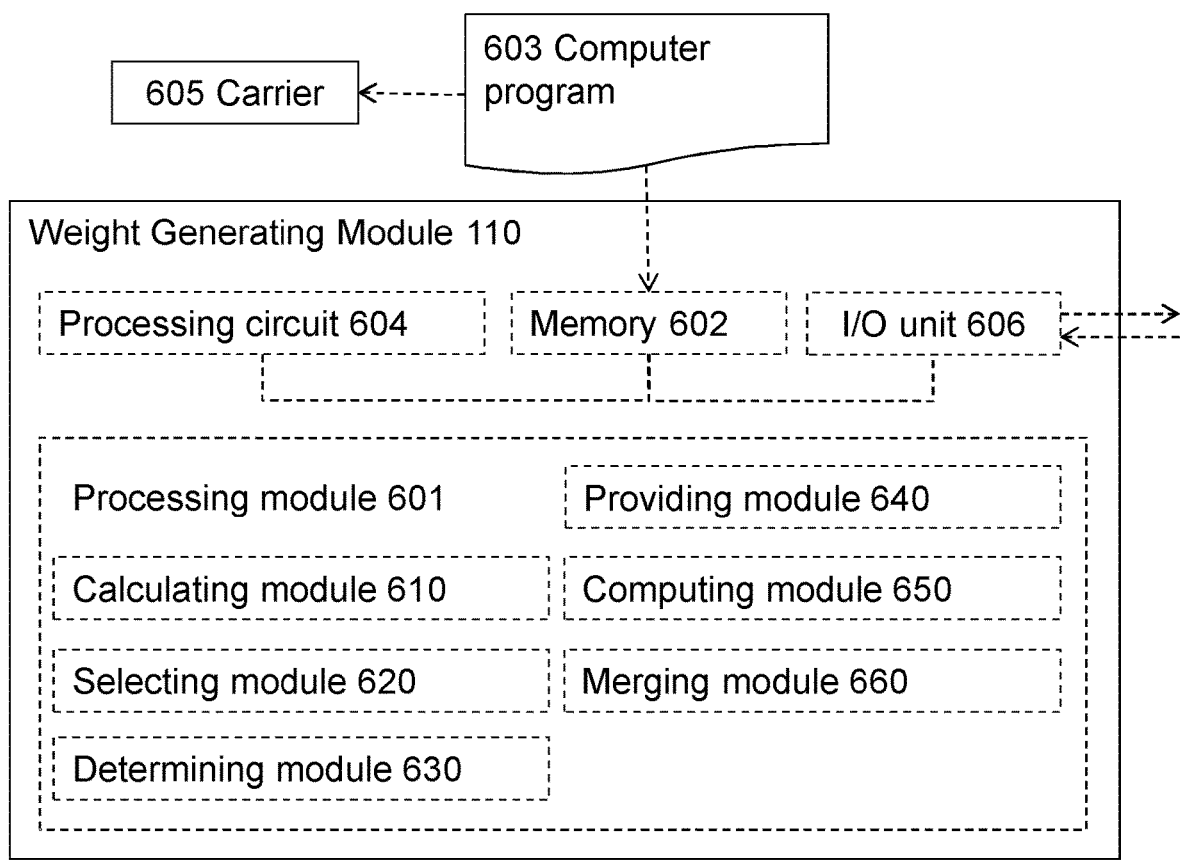
FIG. 6 is a block diagram illustrating embodiments of the Weight Generating Module.

With reference to FIG. 6, a schematic block diagram of embodiments of the Weight Generating Module 110 of FIG. 1 is shown.

The Weight Generating Module 110 may comprise a processing module 601, such as a means for performing the methods described herein. The means may be embodied in the form of one or more hardware modules and/or one or more software modules The Weight Generating Module 110 may further comprise a memory 602. The memory may comprise, such as contain or store, instructions, e.g. in the form of a computer program 603, which may comprise computer readable code units.

According to some embodiments herein, the Weight Generating Module 110 and/or the processing module 601 comprises a processing circuit 604 as an exemplifying hardware module. Accordingly, the processing module 601 may be embodied in the form of, or 'realized by', the processing circuit 604. The instructions may be executable by the processing circuit 604, whereby the Weight Generating Module 110 is operative to perform the methods of FIG. 5. As another example, the instructions, when executed by the Weight Generating Module 110 and/or the processing circuit 604, may cause the Weight Generating Module 110 to perform the method according to FIG. 5.

FIG. 6 further illustrates a carrier 605, or program carrier, which comprises the computer program 603 as described directly above.

In some embodiments, the processing module 601 comprises an Input/Output module 606, which may be exemplified by a receiving module and/or a sending module as described below when applicable.

In further embodiments, the Weight Generating Module 110 and/or the processing module 601 may comprise one or more of a calculating module 610, a selecting module 620, a determining module 630, a providing module 640, a computing module 650, and a merging module 660 as exemplifying hardware modules. In other examples, one or more of the aforementioned exemplifying hardware modules may be implemented as one or more software modules.

Accordingly, the Weight Generating Module 110 is configured for generating a respective set of weights representing a respective policy out of a plurality of policies.

As mentioned, the respective set of weights defines a respective allocation of a respective host machine 151, 152, 153 obtained from a hardware system 100. The hardware system 100 comprises a memory pool 105, 106, 107, comprising memory units, and a CPU pool 102, 103, 104, comprising CPUs. A total number of pairs of groups C1-C6, M1-M6, comprising the CPUs and memory units, are associated with latencies, each of the latencies indicating a respective latency between a respective group C1-C6 of CPUs and a respective group M1-M6 of memory units. The respective policy is defined by a respective set of user-defined weights relating to a number of collections of the pairs. The respective policy is associated with a respective allocation weight relating to requests for the respective allocation of the respective host machine 151, 152, 153.

Therefore, according to the various embodiments described above, the Weight Generating Module 110 and/or the processing module 601 and/or the calculating module 610 is configured for calculating a respective user-defined number of pairs for each collection of the number of collections by distributing the total number of pairs among the number of collections for each respective policy based the respective set of user-defined weights and the respective allocation weight.

The Weight Generating Module 110 and/or the processing module 601 and/or the selecting module 620 is configured for selecting, for said each collection, the respective user-defined number of pairs from among the total number of pairs in increasing order with respect to the latencies to obtain a respective sub-set of collection weights relating to latencies associated with said each collection. A set of collection weights comprises each of the respective sub-sets of collection weights.

The Weight Generating Module 110 and/or the processing module 601 and/or the determining module 630 is configured for determining, for said each respective policy, the respective set of weights representing the respective policy based on the set of collection weights.

The Weight Generating Module 110 and/or the processing module 601 and/or the providing module 640 is configured for providing, for said each respective policy, the respective set of weights.

The Weight Generating Module 110 and/or the processing module 601 and/or the computing module 650 may be configured for computing a histogram including a respective number of pairs for each respective latency of the latencies.

The Weight Generating Module 110 and/or the processing module 601 and/or the computing module 650, or a further computing module (not shown), may be configured for computing the total number of pairs based on the histogram.

The Weight Generating Module 110 and/or the processing module 601 and/or the merging module 660 may be configured for merging, at least two weights of the respective set of weights into a common weight representative of any pair associated with latencies for said at least two weights.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a set of server machines of a cloud system.

As used herein, the term "module" may refer to one or more functional modules, each of which may be implemented as one or more hardware modules and/or one or more software modules and/or a combined software/hardware module in a node. In some examples, the module may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

The invention claimed is:

1. A method for generating a respective set of weights for each respective policy of a plurality of policies, wherein the respective set of weights defines a respective allocation of a respective host machine obtained from a hardware system, wherein the hardware system comprises a memory pool, comprising memory units, and a Central Processing Unit (CPU) pool, comprising CPUs, wherein a total number of pairs of groups, comprising the CPUs and memory units, are associated with latencies, each of the latencies indicating a respective latency between a respective group of CPUs and a respective group of memory units, wherein each respective policy is defined by a respective set of user-defined weights relating to a number of collections of the pairs and wherein each respective policy is associated with a respective allocation weight relating to requests for the respective allocation of the respective host machine, the method comprising:
    calculating a respective number of pairs for each collection of the number of collections by distributing the total number of pairs among the number of collections for the plurality of policies based on the respective set of user-defined weights and the respective allocation weight for each respective policy, wherein the collections of each policy are ordered based on latency;
    combining collections of different policies having similarly based latency ordering into respective sets of collections;
    allocating for each set of collections, the respective calculated number of pairs from among the total number of pairs based on ordering with respect to the latencies to obtain a respective set of collection weights relating to latencies associated with each set of collections, wherein the set of collection weights includes different latencies;
    determining, for each respective policy, a portion of each set of collections to be allocated based on the respective user-defined weights for that policy to provide a set of weights related to different latencies; and
    allocating, for each respective policy, a number of pairs determined from the sets of collections and having the set of weights related to different latencies.

2. The method according to claim 1, wherein the method further comprises:
    computing a histogram including a respective number of pairs for each respective latency of the latencies.

3. The method according to claim 2, wherein the method further comprises:
    computing the total number of pairs based on the histogram.

4. The method according to claim 1, wherein the method further comprises:
    merging, at least two weights of the respective set of weights into a common weight representative of a pair associated with latencies for said at least two weights.

5. A non-transitory computer-readable storage medium having stored there on computer readable code which, when executed on a processor for generating a respective set of weights for each respective policy of a plurality of policies, wherein the respective set of weights defines a respective allocation of a respective host machine obtained from a hardware system, wherein the hardware system comprises a memory pool, comprising memory units, and a Central Processing Unit (CPU) pool, comprising CPUs, wherein a total number of pairs of groups, comprising the CPUs and memory units, are associated with latencies, each of the latencies indicating a respective latency between a respective group of CPUs and a respective group of memory units, wherein each respective policy is defined by a respective set of user-defined weights relating to a number of collections of the pairs and wherein each respective policy is associated with a respective allocation weight relating to requests for the respective allocation of the respective host machine, causes the processor to perform operations comprising:
    calculating a respective number of pairs for each collection of the number of collections by distributing the total number of pairs among the number of collections for the plurality of policies based on the respective set of user-defined weights and the respective allocation weight for each respective policy, wherein the collections of each policy are ordered based on latency;

combining collections of different policies having similarly based latency ordering into respective sets of collections;

allocating for each set of collections, the respective calculated number of pairs from among the total number of pairs based on ordering with respect to the latencies to obtain a respective set of collection weights relating to latencies associated with each set of collections, wherein the set of collection weights includes different latencies;

determining, for each respective policy, a portion of each set of collections to be allocated based on the respective user-defined weights for that policy to provide a set of weights related to different latencies; and allocating, for each respective policy, a number of pairs determined from the sets of collections and having the set of weights related to different latencies.

6. An apparatus configured for generating a respective set of weights for each respective policy of a plurality of policies, wherein the respective set of weights defines a respective allocation of a respective host machine obtained from a hardware system, wherein the hardware system comprises a memory pool, comprising memory units, and a Central Processing Unit (CPU) pool, comprising CPUs, wherein a total number of pairs of groups, comprising the CPUs and memory units, are associated with latencies, each of the latencies indicating a respective latency between a respective group of CPUs and a respective group of memory units, wherein each respective policy is defined by a respective set of user-defined weights relating to a number of collections of the pairs and wherein each respective policy is associated with a respective allocation weight relating to requests for the respective allocation of the respective host machine, the apparatus comprising:

a processor; and
a memory containing instructions which, when executed by the processor, cause the apparatus to perform operations to:
  calculate a respective number of pairs for each collection of the number of collections by distributing the total number of pairs among the number of collections for the plurality of policies based on the respective set of user-defined weights and the respective allocation weight for each respective policy, wherein the collections of each policy are ordered based on latency;
  combine collections of different policies having similarly based latency ordering into respective sets of collections;
  allocate for each set of collections, the respective calculated number of pairs from among the total number of pairs based on ordering with respect to the latencies to obtain a respective set of collection weights relating to latencies associated with each set of collections, wherein the set of collection weights includes different latencies;
  determine, for each respective policy, a portion of each set of collections to be allocated based on the respective user-defined weights for that policy to provide a set of weights related to different latencies; and
  allocate, for each respective policy, a number of pairs determined from the sets of collections and having the set of weights related to different latencies.

7. The apparatus according to claim 6, wherein the apparatus is further configured to perform operations to compute a histogram including a respective number of pairs for each respective latency of the latencies.

8. The apparatus according to claim 7, wherein the apparatus is further configured to perform operations to compute the total number of pairs based on the histogram.

9. The apparatus according to claim 6, wherein the apparatus is further configured to perform operations to merge, at least two weights of the respective set of weights into a common weight representative of a pair associated with latencies for said at least two weights.

* * * * *